(12) United States Patent  
Morito et al.

(10) Patent No.: US 8,999,447 B2
(45) Date of Patent: Apr. 7, 2015

(54) METHOD FOR MANUFACTURING SOIL-RESISTANT GLASS AND SOIL-RESISTANT GLASS

(75) Inventors: Yoshihiro Morito, Fukushima (JP); Katsuyuki Sasazaki, Fukushima (JP); Katsuyuki Nakano, Fukuoka (JP); Etsuo Nomura, Chiba (JP)

(73) Assignee: Asaka Riken Co., Ltd., Fukushima (JP)

( * ) Notice: Subject to any disclaimer, the term of this patent is extended or adjusted under 35 U.S.C. 154(b) by 625 days.

(21) Appl. No.: 13/376,684

(22) PCT Filed: Jun. 9, 2010

(86) PCT No.: PCT/JP2010/003848
§ 371 (c)(1),
(2), (4) Date: Dec. 7, 2011

(87) PCT Pub. No.: WO2010/143425
PCT Pub. Date: Dec. 16, 2010

(65) Prior Publication Data
US 2012/0082792 A1    Apr. 5, 2012

(30) Foreign Application Priority Data
Jun. 9, 2009    (JP) .................................. 2009-138543

(51) Int. Cl.
*B05D 3/02* (2006.01)
*B05D 3/00* (2006.01)
*B01J 35/00* (2006.01)
*B01J 37/02* (2006.01)
*C03C 17/02* (2006.01)
*B01J 21/06* (2006.01)
*B01J 21/08* (2006.01)

(52) U.S. Cl.
CPC .............. *B01J 35/004* (2013.01); *B01J 21/063* (2013.01); *B01J 21/08* (2013.01); *B01J 37/0215* (2013.01); *C03C 17/02* (2013.01); *C03C 2217/71* (2013.01); *C03C 2218/113* (2013.01)

(58) Field of Classification Search
CPC .......... B01J 21/063; B01J 1/08; B01J 35/004; B01J 37/0215; C03C 17/02
USPC ........................................................ 427/535
See application file for complete search history.

(56) References Cited

U.S. PATENT DOCUMENTS

| 6,429,169 | B1 * | 8/2002 | Ichinose ...................... 502/350 |
| 2003/0179476 | A1 | 9/2003 | Kobayashi et al. |
| 2005/0069639 | A1 * | 3/2005 | Ogata et al. ................... 427/180 |
| 2005/0123471 | A1 | 6/2005 | Nakano et al. |
| 2009/0123769 | A1 * | 5/2009 | Masaki et al. ................ 428/469 |

FOREIGN PATENT DOCUMENTS

| JP | 07-309616 | 11/1995 |
| JP | 2003-073585 | 3/2003 |
| JP | 2005-162554 | 6/2005 |
| JP | 2006-045043 | 2/2006 |
| JP | 2008-212841 | 9/2008 |
| WO | 02/100633 | 12/2002 |
| WO | 03/072661 | 9/2003 |
| WO | WO 2007119489 A1 * | 10/2007 |

OTHER PUBLICATIONS

English translation of the International Preliminary Report.
International Search Report issued Aug. 3, 2010 in International (PCT) Application No. PCT/JP2010/003848.
English translation of Written Reply to International Search Report and Written Opinion of WIPO.

* cited by examiner

*Primary Examiner* — Dah-Wei D Yuan
*Assistant Examiner* — Kristen A Dagenais
(74) *Attorney, Agent, or Firm* — Wenderoth, Lind & Ponack, L.L.P.

(57) ABSTRACT

A method for manufacturing soil-resistant glass the surface of which is covered with a coating film having a high hardness, and the soil-resistant glass are provided. A coating film comprising titania or/and titania-silica is formed by coating a glass surface with a photocatalyst solution comprising the titania or/and the titania-silica each having a photocatalytic function and heating the applied photocatalyst solution at a temperature higher than at least 100° C. The heating temperature may be a temperature higher than 100° C. and 300° C. or lower. The time of heating at the above-mentioned temperature may be at least 2 minutes or longer.

6 Claims, 6 Drawing Sheets

Fig.3

TITANIA-SILICA

| SAMPLE No. | RATIO OF PEROXO TO ANATASE | HEATING TEMPERATURE(°C) | HEATING TIME (min) | PENCIL HARDNESS (H) | ADHESION (CLASS) |
|---|---|---|---|---|---|
| 1 | 9:1 | 20 | 120 | 2H | 0 |
| 2 | 7:3 | 20 | 120 | 2H | 0 |
| 3 | 9:1 | 20 | 1440 | 2H | 0 |
| 4 | 7:3 | 20 | 1440 | 2H | 0 |
| 5 | 9:1 | 60 | 5 | 2H | 0 |
| 6 | 7:3 | 60 | 5 | 2H | 0 |
| 7 | 9:1 | 60 | 10 | 2H | 0 |
| 8 | 7:3 | 60 | 10 | 2H | 0 |
| 9 | 9:1 | 100 | 5 | 2H | 0 |
| 10 | 7:3 | 100 | 5 | 2H | 0 |
| 11 | 9:1 | 100 | 10 | 3H | 0 |
| 12 | 7:3 | 100 | 10 | 3H | 0 |
| 13 | 9:1 | 105 | 2 | 5~6H | 0 |
| 14 | 7:3 | 105 | 2 | 4H | 0 |
| 15 | 9:1 | 105 | 5 | 5H | 0 |
| 16 | 7:3 | 105 | 5 | 5H | 0 |
| 17 | 9:1 | 110 | 5 | 6H | 0 |
| 18 | 7:3 | 110 | 5 | 6H | 0 |
| 19 | 9:1 | 120 | 2 | 6H | 0 |
| 20 | 7:3 | 120 | 2 | 6H | 0 |
| 21 | 9:1 | 120 | 5 | 6H | 0 |
| 22 | 7:3 | 120 | 5 | 6H | 0 |
| 23 | 9:1 | 140 | 2 | 6H | 0 |
| 24 | 7:3 | 140 | 2 | 6H | 0 |
| 25 | 9:1 | 140 | 5 | 6H | 0 |
| 26 | 7:3 | 140 | 5 | 6H | 0 |
| 27 | 9:1 | 160 | 2 | 6H | 0 |
| 28 | 7:3 | 160 | 2 | 6H | 0 |
| 29 | 9:1 | 160 | 5 | 6H | 0 |
| 30 | 7:3 | 160 | 5 | 6H | 0 |

(a)

HEATING TEMPERATURE DEPENDENCE OF PENCIL HARDNESS
OF PEROXO:ANATASE (7:3) COATING (b)

HEATING TEMPERATURE DEPENDENCE OF PENCIL HARDNESS
OF PEROXO:ANATASE (9:1) COATING

PEROXO TITANIA

| SAMPLE No. | HEATING TEMPERATURE (°C) | HEATING TIME (min) | PENCIL HARDNESS (H) | ADHESION (CLASS) |
|---|---|---|---|---|
| 31 | 20 | 1440 | 2B | 0 |
| 32 | 100 | 5 | 2H | 0 |
| 33 | 105 | 2 | 2H | 0 |
| 34 | 105 | 5 | 2H | 0 |
| 35 | 110 | 5 | 2H | 0 |
| 36 | 120 | 5 | 3H | 0 |
| 37 | 140 | 5 | 4H | 0 |

HEATING TEMPERATURE DEPENDENCE OF PENCIL HARDNESS
OF PEROXO TITANIA COATING

Fig.7

COMMERCIAL CRYSTALLINE TITANIA

| SAMPLE No. | COMPARATIVE EXAMPLE | HEATING TEMPERATURE (°C) | HEATING TIME (min) | PENCIL HARDNESS (H) |
|---|---|---|---|---|
| 41 | CRYSTALLINE TITANIA a | 20 | 1440 | B |
| 42 | CRYSTALLINE TITANIA a | 140 | 5 | 2H |
| 43 | CRYSTALLINE TITANIA b | 20 | 1440 | 5B |
| 44 | CRYSTALLINE TITANIA b | 140 | 5 | HB |

METHOD FOR MANUFACTURING SOIL-RESISTANT GLASS AND SOIL-RESISTANT GLASS

This application is a U.S. national stage of International Application No. PCT/JP2010/003848 filed Jun. 9, 2010.

TECHNICAL FIELD

The present invention relates to a method for manufacturing soil-resistant glass and to the soil-resistant glass. In particular, the invention relates to a method for manufacturing soil-resistant glass the surface of which is covered with a coating material having a photocatalytic function and to the soil-resistant glass.

TECHNICAL BACKGROUND

A photocatalyst is a functional material that exhibits its catalytic action when it absorbs light, and titania ($TiO_2$) that exhibits activity when exposed to ultraviolet light is known as a representative photocatalyst. In addition, titania having a peroxy bond and a composite compound that includes titania and silica bonded to each other and has a peroxy bond (hereinafter referred to as "titania-silica") are known as photocatalysts having not only an improved photocatalytic function but also additional functions (see, for example, Patent Literature 1). In such titania-silica, the photocatalytic function is exerted mainly by the titania structure portion, a hydrophilic function is exerted mainly by the silica structure portion, and a visible light absorption function is exerted mainly by the peroxy bond structure portion.

Such a photocatalyst with its catalytic action has a function of decomposing soil such as organic matter. Therefore, soil-resistant glass that can be prevented from being soiled over a long time can be produced by coating the glass surface with the photocatalyst.

In general, as a conventional method for coating a glass surface with a photocatalyst, the glass surface is coated with a solution comprising the photocatalyst, and the applied solution is subjected to heat treatment to form the coating of the photocatalyst. In the conventional method, since the crystallization temperature of titania is at least 300° C. or higher, the heating temperature when the coating is formed has been set to 300 to 500° C. to bake the coating onto the glass surface.

However, the conventional method requires an apparatus for heating to high temperatures of 300° C. or higher and a separate apparatus for cooling and has the problem in that manufacturing cost is high because the amount of heat is large. In addition, since the maximum use temperature of, for example, float glass used for a pane is approximately 380° C., the heat treatment may cause a reduction in activity and other adverse effects on the glass itself due to, for example, permeation of titania. Therefore, it is desirable to lower the heating temperature. However, it is concerned that, when the heating temperature is lowered, the adhesion and hardness of the coating film become insufficient. With the conventional photocatalyst solution, it is difficult to overcome all the foregoing problems, and therefore there are still many hurdles to overcome to establish the integrated production of a high-activity photocatalyst-coated glass plate in a factory.

CITATION LIST

Patent Literature

Patent Literature 1: Japanese Patent No. 2913257

SUMMARY OF INVENTION

Technical Problem

Examples of the problems to be solved by the invention include the foregoing problems. Accordingly, it is an object of the present invention to provide a method for manufacturing soil-resistant glass the surface of which is covered with a coating film having a photocatalytic function, particularly soil-resistant glass the surface of which is covered with a coating film having a high film hardness, and to provide the soil-resistant glass.

It is another object of the present invention to provide a method for manufacturing soil-resistant glass the surface of which is covered with a coating film having not only a high film hardness but also high adhesion to the glass and to provide the soil-resistant glass.

Solution to Problem

A method for manufacturing soil-resistant glass according to the present invention is a method for manufacturing soil-resistant glass the surface of which is covered with a coating material comprising titania or/and titania-silica each having a photocatalytic function. The method is characterized by coating a glass surface with a photocatalyst solution comprising the titania or/and the titania-silica without using an undercoat or mixing another solution and heating the applied photocatalyst solution at a temperature higher than at least 100° C. to form a coating film.

The "titania" means a titanium oxide having a peroxy bond of TiOOH or TiOOTi, and the "titania-silica" means a compound comprising a composite compound in which Ti and Si are bonded via O and including at least one of peroxy bonds including TiOOH, SiOOH, TiOOTi, SiOOSi, and TiOOSi. The "titania-silica" is distinguished clearly from titania and a mixture obtained by simply mixing titania and silica.

The heating temperature may be a temperature higher than 100° C. and, for example, 300° C. or lower. Preferably, in consideration of cooling in the following process, this temperature is higher than 100° C. and lower than 140° C. Preferably, the titania or/and titania-silica is a mixture of peroxo titania or/and peroxo titania-silica and anatase titania or/and anatase titania-silica that are obtained by heat treatment of the peroxo titania or/and the peroxo titania-silica. In such a case, the photocatalyst solution may contain the peroxo titania-silica and the anatase titania-silica in a ratio of, for example, 7:3 to 9:1. The photocatalyst solution may contain the peroxo titania, and the heating temperature may be 140° C. or higher and 300° C. or lower. Preferably, the heating time at the above-mentioned temperature is at least 2 minutes or longer. Preferably, the mixture of the peroxo type compound and the anatase type compound is a solution mixture comprising a peroxo type solution in an amount of 50% or more. The above method for manufacturing soil-resistant glass may be a factory production method including a series of manufacturing steps including pretreatment such as washing, application of the solution mixture, heat treatment at the heating temperature, and cooling treatment.

Advantageous Effects of Invention

According to the present invention, a glass surface is coated with a photocatalyst solution comprising titania or/and titania-silica without using an undercoat or mixing another solution, and the applied photocatalyst solution is heated at a temperature higher than at least 100° C. to form a coating film. Soil-resistant glass the surface of which is covered with the coating film having a high film hardness can thereby be manufactured. The film hardness of the coating film measured by a scratch hardness test (Pencil method, JIS K5600-5-4) was 6H or higher for most of test examples.

Moreover, according to the present invention, the coating film formed by coating the glass surface with the photocatalyst solution comprising titania or/and titania-silica without using an undercoat or mixing another solution and heating the applied photocatalyst solution at a temperature higher than at least 100° C. has a high film hardness and excellent adhesion to the glass. The adhesion of the coating film was measured by an adhesion test (Cross-cut method, JIS K5600-5-6), and the results showed that the adhesion was class 0 (indicating no flaking) for most of the test examples.

BRIEF DESCRIPTION OF DRAWINGS

FIG. 3 shows the results of tests performed to examine the effects of the present invention.

FIG. 7 shows the results of tests performed to examine the effects of the present invention.

DESCRIPTION OF EMBODIMENT

Figure 1:
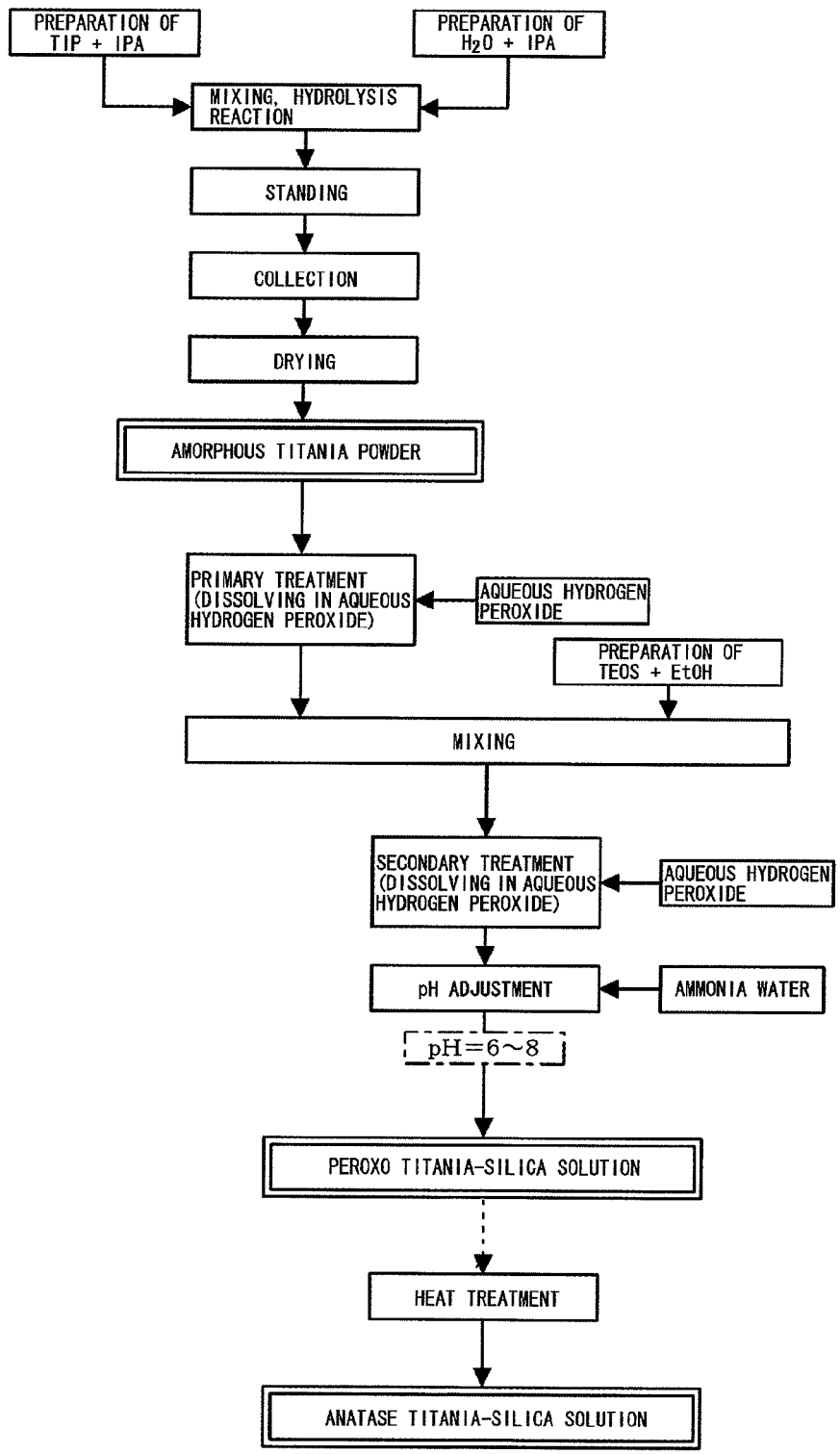
FIG. 1 is a flowchart for the preparation of a titania-silica photocatalyst solution used in an embodiment of the present invention.

Soil-resistant glass and a method for manufacturing the same according to a preferred embodiment of the present invention will next be described in detail. However, the technical scope of the present invention is not particularly limited to the embodiment described below.

The surface of the soil-resistant glass according to the present embodiment is covered with a coating film comprising titania or/and titania-silica and the soil-resistant glass has a function of decomposing soil (such as organic matter) adhering to the glass surface based on the photocatalytic function exerted by the titania or/and titania-silica. In addition, the soil-resistant glass has a soil resistance function that is obtained by the hydrophilicity exerted particularly by the silica structure portion. The "titania" stated on the present description means a titanium oxide having at least a peroxy bond of TiOOH or TiOOTi, and the "titania-silica" means a compound comprising a composite compound in which Ti and Si are bonded via O and including at least one of peroxy bonds including TiOOH, SiOOH, TiOOTi, SiOOSi, and TiOOSi. The "titania-silica" is distinguished from titania and a mixture obtained by simply mixing titania and silica. Such titania-silica has been reported in, for example, Patent Literature 1 described above.

It is sufficient that the coating film comprises at least titania or/and titania-silica each having a peroxy bond, and the coating film is allowed to comprise any other component. The coating film may contain, in addition to the titania or/and titania-silica, for example, a small amount of a resin emulsion or colloidal silica used as a binder for improving film-forming properties and adhesion properties and other materials such as a surfactant. The coating film may further comprise a component for imparting an additional function to the coating material to the film, for example, an antimicrobial component for imparting an antimicrobial function to the film (such as a silver colloid or a silver compound).

The coating film comprising titania or/and titania-silica is formed by coating the glass surface with a photocatalyst solution comprising the titania or/and the titania-silica and then Subjecting the applied photocatalyst solution to heat treatment at a predetermined temperature for a predetermined time. Examples of the photocatalyst solution comprising titania or/and titania-silica include a sol in which titania or/and titania-silica fine particles having a diameter of several run to several tens of μm are dispersed. Preferably, the titania or/and titania-silica fine particles are fine particles of peroxo titania or/and peroxo titania-silica described later. However, the present invention is not limited thereto. Any one of the anatase type, rutile type, anatase-rutile type, and brookite type may be used, and one selected from the above types may be used as a mixture with the peroxo titania or/and peroxo titania-silica. A mixture of peroxo titania or/and titania-silica and anatase titania or/and titania-silica in a predetermined ratio, for example, 7:3 to 9:1, is more preferred. The concentration of the titania or/and titania-silica fine particles in the solution may be adjusted to, for example, 0.05 percent by mass to 3 percent by mass. The medium used to disperse the titania-silica fine particles may be selected from, for example, water, alcohols, aqueous hydrogen peroxide, dilute nitric acid, and the like.

Examples of the type of the glass used as the material to be coated include soda glass, crystal glass, and borosilicate glass. However, no limitation is imposed on the type of glass. Examples of the application of the glass include panes of buildings and automobiles. However, no limitation is imposed on the application of the glass.

A preferred method for preparing the photocatalyst solution will next be described with reference to FIG. 1. A flowchart shown in FIG. 1 is a preferred example of the preparation of a photocatalyst solution comprising peroxo titania-silica fine particles dispersed therein and a photocatalyst solution comprising anatase titania-silica fine particles dispersed therein that are obtained by using the peroxo titania-silica fine particles as a raw material.

As shown in FIG. 1, first, a solution mixture of isopropanol (IPA) and titanium tetraisopropoxide (TIP) used as the raw material hydrolyze the TIP, and titania fine particles are thereby generated. The molar mixing ratio may be, for example, TIP:IPA:$H_2O$=1:10:4. The obtained titania fine particles are separated by filtration and dried at, for example, 100° C. to obtain a titania powder. The thus-obtained titania powder is amorphous titania having no grain boundaries. The raw material of titania is not limited to TIP, and other titanium alkoxides (compounds in which H in the OH group of an alcohol molecule has been substituted with Ti) such as titanium tetraethoxide may be used.

Next, the amorphous titania is dissolved in, for example, a 35 mass % aqueous hydrogen peroxide solution to generate a gel of titania (this treatment is referred to as "primary treatment"). Then a mixture of ethanol and tetraethyl orthosilicate (TEOS), a precursor of silica, is added to the gel.

Next, for example, a 35 mass % aqueous hydrogen peroxide solution is further added to the titania gel to which the silica precursor has been added to thereby peroxidize the mixture, and a sol of titania-silica fine particles in which titania and silica have been bonded via a peroxy bond is thereby generated (this treatment is referred to as "secondary treatment"). Finally, to adjust the pH, an alkaline solution, for example, a 25% aqueous ammonia solution is added, so that the pH is adjusted to a neutral range (for example 6 to 8), and a photocatalyst solution comprising the peroxo titania-silica fine particles is thereby obtained.

Anatase titania-silica fine particles can be prepared by converting the peroxo titania-silica fine particles to the anatase type, as shown in FIG. 1. More specifically, the photocatalyst solution comprising the peroxo titania-silica fine particles is subjected to heat treatment at, for example, 95 to 120° C. The peroxo titania-silica is thereby converted to anatase titania-silica, and a photocatalyst solution comprising the anatase titania-silica fine particles is thereby obtained.

Figure 2:
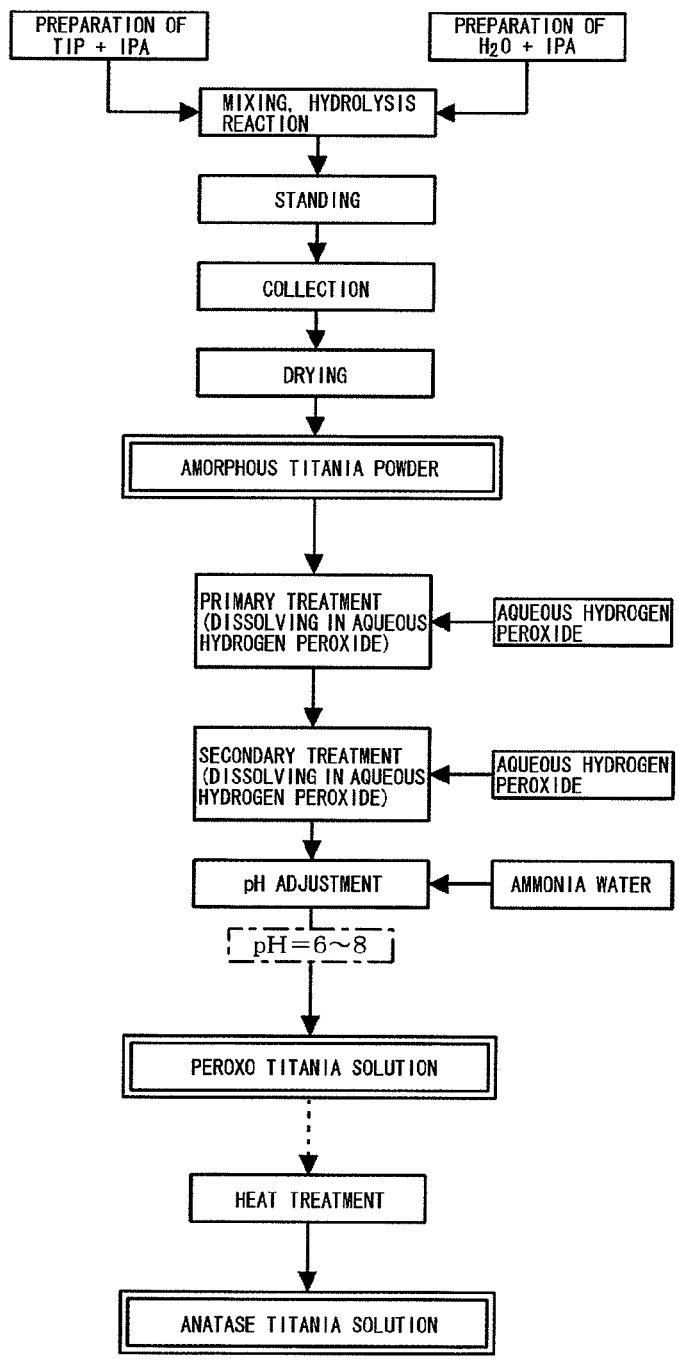
FIG. 2 is a flowchart for the preparation of a peroxo titania photocatalyst solution used in the embodiment of the present invention.

Referring next to FIG. 2, a description will be given of a preferred example of the preparation of a photocatalyst solution comprising peroxo titania fine particles dispersed therein and a photocatalyst solution comprising anatase titania fine particles dispersed therein that are obtained by using the peroxo titania fine particles as a raw material.

As is clear by comparing the flowcharts in FIGS. 1 and 2, the photocatalyst solution comprising the peroxo titania fine particles dispersed therein can be prepared by the same procedure as that for the titania-silica except that a gel of titania to which no TEOS and EtOH have been added is subjected to the above-mentioned secondary treatment using hydrogen peroxide to form a sol of titania. Anatase titania fine particles can be prepared by converting the obtained peroxo titania fine particles to the anatase type.

According to the flowcharts shown in FIGS. 1 and 2, photocatalyst solutions comprising any of peroxo titania-silica, anatase titania-silica, peroxo titania, and anatase titania can be prepared. In the present embodiment, one of these photocatalyst solutions or a solution mixture of two or more thereof is used to form a coating film on a glass surface. To form the coating film, a mixture of a peroxo type and an anatase type is preferably used, and a solution mixture comprising 50% or more of a peroxo type solution is more preferably used. When the photocatalyst solution contains the mixture of peroxo titania-silica and anatase titania-silica, the ratio of the peroxo type to the anatase type is preferably 7:3 to 9:1.

A description will next be given of a procedure for forming a coating film on a glass surface using any of the above-described photocatalyst solutions. In the following description, an example when a mixture of a solution comprising peroxo titania-silica fine particles and a solution comprising anatase titania-silica fine particles is used will be described. Even when a solution comprising titania fine particles is used, a coating film can be formed by the same procedure. In the following description, the production process is assumed to be performed in a factory, but this is not a limitation. The process may be performed on-site.

First, glass with its surface subjected to pretreatment such as washing or polishing (hydrophilization) is coated, using a coating method, with the solution mixture of the photocatalyst solutions prepared by the above-mentioned method. Any one of coating methods such as spray coating, dip coating, spin coating, roller coating, and hand coating using a brush may be used. The coating amount is adjusted such that the coating amount of titania-silica per unit area is 4 g/m$^2$ to 30 g/m$^2$. The thickness of the coating film is preferably 40 nm to 600 nm. Next, the glass coated with the solutions is heated in a heating apparatus such as an electric furnace. The heating temperature is set to a temperature higher than at least 100° C., and the heating temperature higher than 100° C. is maintained for at least 2 minutes or longer. If the temperature is too high, the energy cost during heating and cooling becomes high, and the obtained effects of the invention are reduced. Therefore, it is preferable to set the heating temperature for the object to be treated at 100 to 140° C. The heating temperature is particularly preferably 110° C. to 140° C. When the solution mixture comprises peroxo titania, a more preferred heating temperature is 140° C. or higher. According to the test results described later, it is sufficient that the time of the heat treatment at the above-mentioned heating temperature is 2 minutes or longer, but is preferably 5 minutes or longer.

After the heat treatment is performed, the glass is cooled and, if necessary, subjected to machining such as cutting, and soil-resistant glass can thereby be produced. The soil-resistant glass can be produced in a factory by a series of manufacturing steps including the above-mentioned pretreatment such as washing, application of the photocatalyst solutions, heat treatment, and cooling treatment.

In the above embodiment, a glass surface is coated with a photocatalyst solution comprising titania or/and titania-silica, and the applied photocatalyst solution is heated at a (the) temperature higher than at least 100° C. to form a coating film. In this manner, as can be seen from Examples described later, soil-resistant glass the surface of which is covered with a coating film having a hardness of 6H or higher as measured by a scratch hardness test (Pencil method, JIS K5600-5-4) can be produced. As can be seen from the Examples described later, the adhesion of each coating film was high, i.e., class 0 (indicating no flaking), as measured by an adhesion test (Cross-cut method, JIS K5600-5-6).

In the conventional case, since the crystallization temperature of titania is 300° C. or higher, baking is commonly performed with the heating temperature set to 300 to 500° C. However, the present inventors have found that, when titania or/and titania-silica each having a peroxy bond are used, the hardness of the coating film sharply increases at a critical temperature of around 100° C. and reaches a sufficient level of 6H, as is clear from the results in the Examples described later. Thus, the inventors have arrived at the present invention. As described above, since a sufficient hardness and sufficient adhesion can be obtained even at low temperature, the manufacturing cost can be reduced. In addition, since a relatively lower than usual temperature being a temperature higher than 100° C. can be used, it is expected that on-site processing, which is difficult with the conventional method, can be performed relatively easily.

In addition, in the present embodiment, since a short heating time being at least 2 minutes can be used to increase the film hardness, the manufacturing cost can be reduced in a more reliable manner, and the difficulty in on-site processing can be reduced in a more reliable manner.

The specific embodiment of the present invention has been described above. However, it is apparent for a person having ordinary knowledge in the technical field that various modifications can be made without departing from the scope of the present invention. Therefore, the technical scope of the present invention is not limited to the above embodiment but should be defined by the claims and equivalents thereof.

EXAMPLES

Test Examples performed to examine the effects of the present invention will next be described.

Test Example 1: Titania-Silica

A glass surface was coated with each photocatalyst solution comprising titania-silica. Heating and drying was performed at different temperatures for different times to examine changes in the physical strength (film hardness) of the coating film and in the adhesion strength between the coating film and the glass. More specifically, (1) a test piece (glass) having a polished surface was dip-coated with each photocatalyst solution. (2) The test piece was placed in a preheated electric furnace and left to stand in the furnace at a predetermined temperature for a predetermined time. (3) After completion of heating, the door of the furnace was half opened to naturally cool the test piece. (4) After natural cooling, i.e., after the temperature of the glass surface was confirmed to be approximately 20° C., the hardness and adhesion of the film were evaluated. The details of the test are as follows.

Test Details

Photocatalyst: two types, peroxo type and anatase type, of titania-silica photocatalyst solutions Test piece: standard glass (100 mm×100 mm×t 1.0 mm)
Hardness test: JIS K5600-5-4, general coating test method—scratch hardness (pencil method)
Adhesion test: JISK5600-5-6, general coating test method—adhesion (cross-cut method)
Heating and drying: electric furnace (no air flow), DO-450C, a product of AS ONE Corporation
The results of Test Example 1 are shown in FIG. 3. FIG. 3 shows the results of the hardness test and the adhesion test for each of the test pieces with the values of the mixing ratio of two types, peroxo type and anatase type, of titania-silica photocatalyst solutions, the heating-drying temperature, and the heating-drying time being set differently. As is clear from the results in FIG. 3, the hardness was as high as 6H for samples No. 13 to 30 for which a set temperature of 105° C. or higher was used. However, for samples No. 1 to 12 for which a set temperature of 100° C. or lower was used, the pencil hardness was 3H or lower. In the pencil hardness test, the hardness (pencil hardness) of a film was defined as a hardness at the boundary between a hardness at which scratches were formed over the entire area scratched with a pencil and a hardness at which a relatively small number of scratches were formed.

Figure 4:
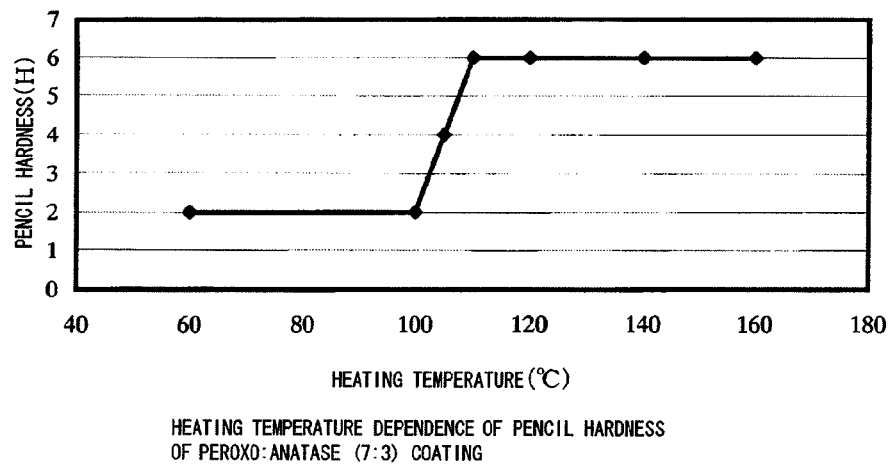
FIG. 4 shows the results of the tests performed to examine the effects of the present invention.
Figure 4:
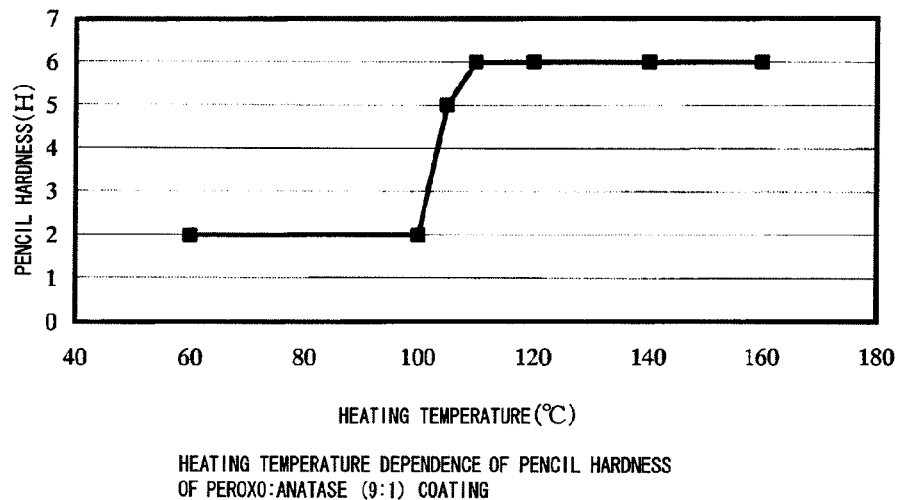

FIG. 4 is a set of graphs showing the relationship between the heating temperature and hardness that is obtained based on the results in FIG. 3. It can be understood from these graphs that, when titania or/and titania-silica were used, the hardness of the coating film changed sharply at the critical temperature higher than 100° C.

As is clear from the results in FIG. 3, it was found that, when titania or/and titania-silica were used, the adhesion to the glass was as high as class 0.

It was found from the above results that soil-resistant glass having a high-hardness coating film with a hardness of 6H can be obtained by coating a glass surface with a titania or/and titania-silica photocatalyst solution and subjecting the applied photocatalyst solution to heat treatment at a temperature higher than at least 100° C.

Test Example 2: Peroxo Titania

The test performed in Test Example 2 is the same as the test in Test Example 1 except that peroxo titania was used instead of titania-silica. The results of evaluation are shown in FIG. 5, and the graph showing the relationship between the heating temperature and the hardness based on the evaluation results is shown in FIG. 6.

Figures 5, 6:
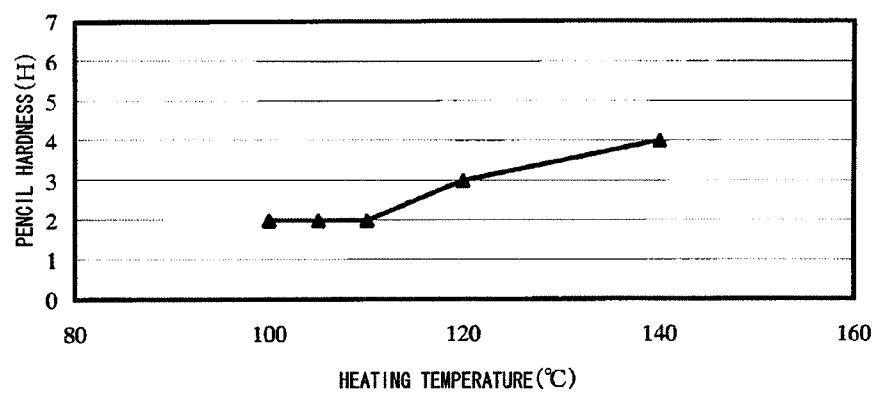
FIG. 5 shows the results of tests performed to examine the effects of the present invention.
FIG. 6 shows the results of the tests performed to examine the effects of the present invention.

As can be seen from the results in FIGS. 5 and 6, even when peroxo titania was used, the hardness of the coating film changed significantly at a critical temperature higher than 100° C., more specifically at 140° C.

(Comparative Test: Crystalline Titania)

In this Test Example, the comparison test performed was the same as that in Test Examples 1 and 2 except that well-known conventional crystalline titania was used instead of titania-silica and peroxo titania. The results of evaluation are shown in FIG. 7. As can be seen from the results of evaluation in FIG. 7, the hardness of the well-known conventional crystalline titania did not increase at a low temperature of about 100° C., and the hardness obtained was only B to HB. This may be the reason that heat treatment must be performed at a high temperature of 300° C. or higher in the conventional case.

The invention claimed is:

1. A method for manufacturing soil-resistant glass a surface of which is covered with a coating film comprising titania-silica having a photocatalytic function,
   the method comprising coating a glass surface with a photocatalyst solution comprising the titania-silica without using an undercoat or mixing another solution, and heating to dry the glass surface coated with the photocatalyst solution to form the coating film, wherein
   the photocatalyst solution comprising the titania-silica is a sol of titania-silica in which titania and silica have been bonded via a peroxy bond, produced by further adding hydrogen peroxide to peroxidize amorphous titania to which tetraethyl orthosilicate has been added, and
   the coating film is formed with a heating temperature from 110° C. to 160° C., and the formed coating film has a film hardness of 6H or higher as measured according to the Pencil method.

2. The method for manufacturing soil-resistant glass according to claim 1, wherein the photocatalyst solution comprises a mixture of peroxy titania or/and peroxy titania-silica and anatase titania or/and anatase titania-silica.

3. The method for manufacturing soil-resistant glass according to claim 1, wherein the photocatalyst solution comprises peroxo titania-silica and anatase titania-silica in a ratio of 7:3 to 9:1.

4. The method for manufacturing soil-resistant glass according to claim 1, wherein a heating time at the heating temperature is at least 2 minutes or longer and 5 minutes or shorter.

5. The method for manufacturing soil-resistant glass according to claim 2, wherein the mixture of the peroxo type compound and the anatase type compound is a solution mixture comprising a peroxo type solution in an amount of 50% or more.

6. The method for manufacturing soil-resistant glass according to claim 1, which is a factory production method including a series of manufacturing steps including pretreatment of washing, application of the photocatalyst solution, heat treatment at the heating temperature, and cooling treatment.

* * * * *